United States Patent [19]
Tidwell et al.

[11] 3,991,666
[45] Nov. 16, 1976

[54] PORTABLE COOKING UNIT

[76] Inventors: William F. Tidwell, Balibago, MacArthur Highway; Lucila M. Cobb, both of Angeles City, Philippines

[22] Filed: Nov. 6, 1975

[21] Appl. No.: 629,612

[52] U.S. Cl. .................................. 99/446; 99/352; 99/467
[51] Int. Cl.² .................................. A47J 37/00
[58] Field of Search ............ 99/446, 339, 352, 355, 99/420, 421 H, 423, 447, 450, 467; 126/21, 25, 299

[56] References Cited
UNITED STATES PATENTS

| | | | |
|---|---|---|---|
| 2,626,559 | 1/1953 | Rau | 99/352 |
| 2,851,941 | 9/1958 | Cogar | 99/352 |
| 3,477,360 | 11/1969 | Raney | 99/339 |
| 3,537,442 | 11/1970 | Berger | 99/446 UX |
| 3,587,446 | 6/1971 | Gardner | 99/423 X |
| 3,882,767 | 5/1975 | Oyler et al. | 99/446 X |
| 3,935,809 | 2/1976 | Bauer | 99/447 |

*Primary Examiner*—Edward L. Roberts
*Assistant Examiner*—Arthur O. Henderson
*Attorney, Agent, or Firm*—William F. Frank

[57] ABSTRACT

A combined barbecue pit and oven comprising a sheet metal box having a two-level top portion, a transverse intermediate wall within said box dividing the same into a lower chamber and a higher chamber, said two chambers communicating with each other through a large opening therebetween, liftable lids covering the top of each chamber, a lower grill slidably disposed within said lower chamber and an upper grill slidably disposed within said higher chamber, a door at the front of said lower chamber and a clean-out port downwardly of said door, a fire box disposed at the bottom of said lower chamber, and air inlet cut-ins on the side wall adjacent said lower chamber, a drip pan disposed within said higher chamber directly below said upper grille, and a chimney disposed on a top wall portion laterally of the higher chamber lid.

9 Claims, 8 Drawing Figures

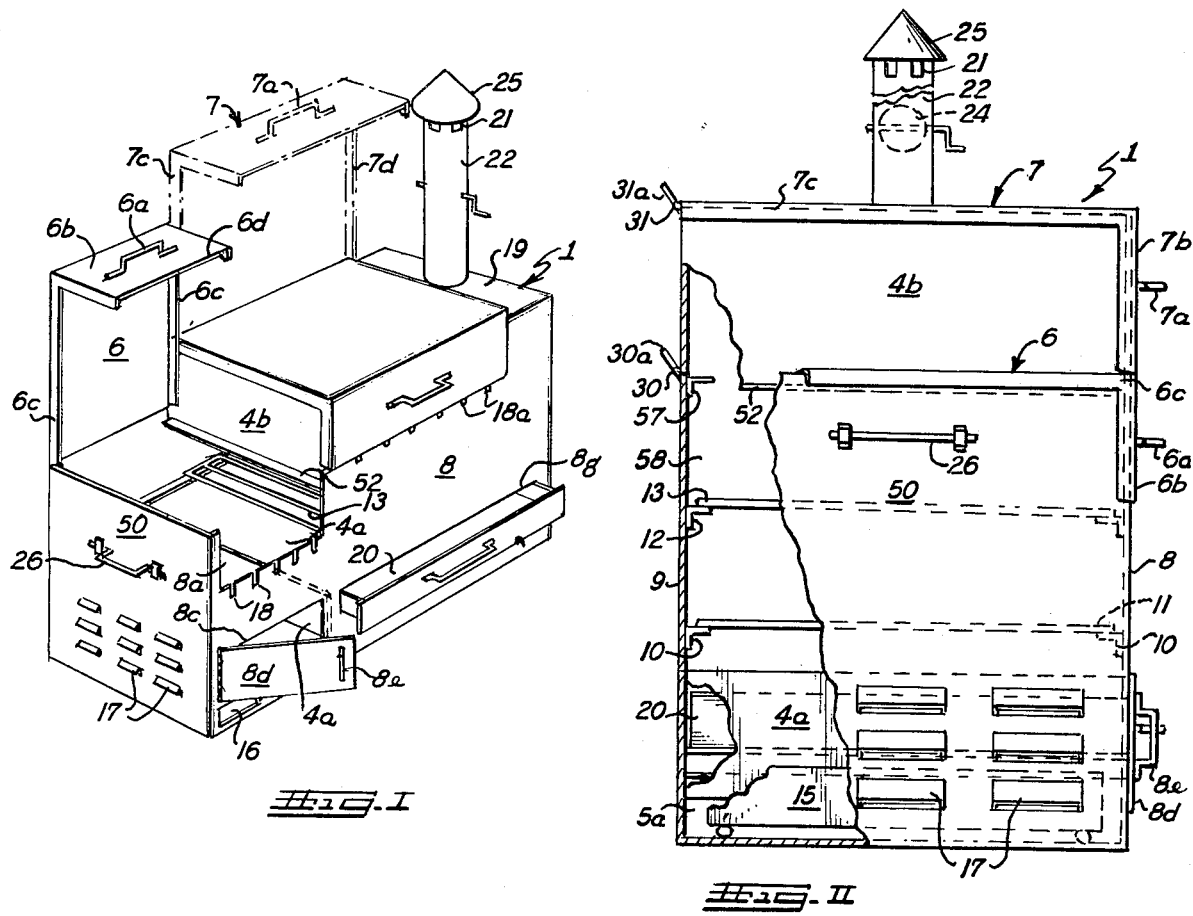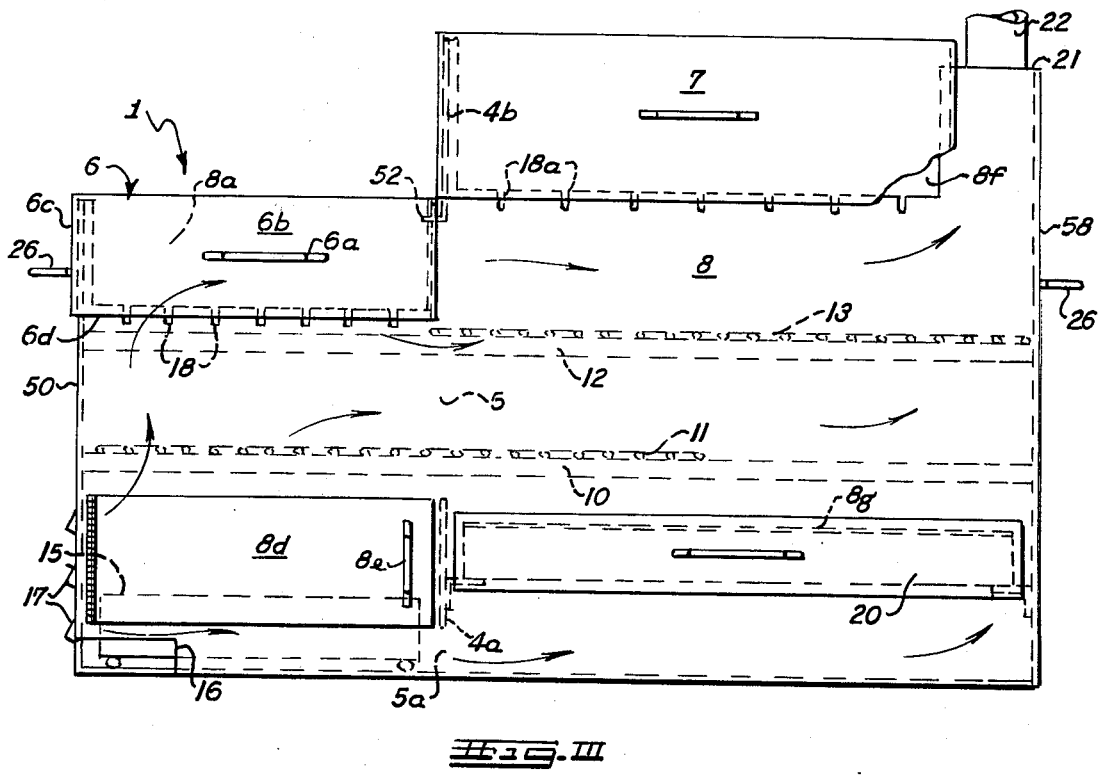

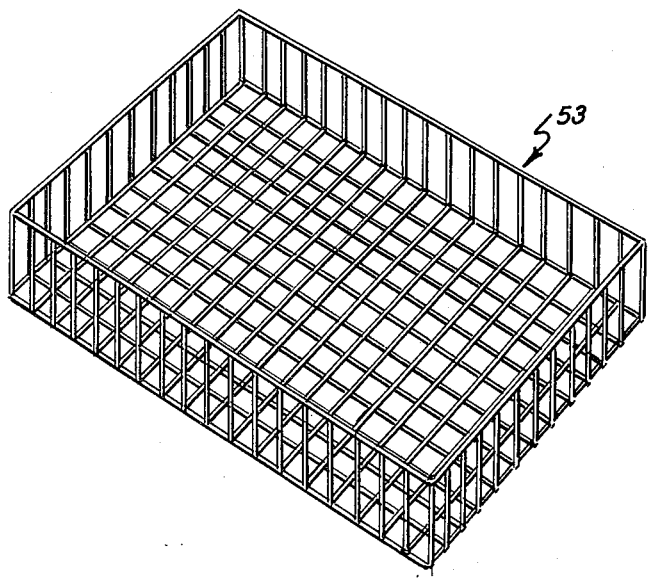
Fig. IV
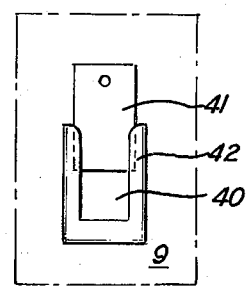
Fig. VIII
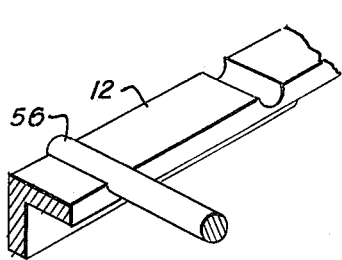
Fig. VII
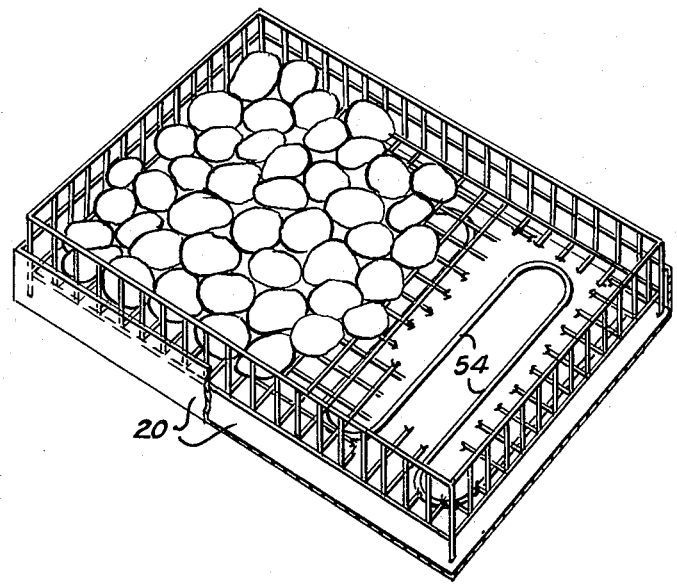
Fig. V
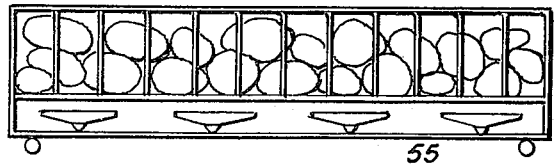
Fig. VI

PORTABLE COOKING UNIT

The present invention relates to devices of a type used to barbecue foods, principally meat. More particularly, the present invention relates to such devices which provide means not only for direct flame or heat application to the products being cooked but also provides a separate compartment, heated by convection, for cooking the food product by smoke or heated air.

BACKGROUND OF THE INVENTION AND PRIOR ART

One class of prior devices to barbecue or roast food products, whether the devices be those using electricity or liquefied petroleum gas or charcoal, are so constructed that the foodstuffs to be barbecued or roasted are generally positioned directly above the electrical heater or the liquefied petroleum gas burner or charcoal. Because of this construction, it is then necessary to have the foodstuff being barbecued or roasted turned or rotated continuously in order to insure an even cooking and to prevent the charring of the foodstuffs.

Hence with such prior devices constant attention is therefore necessary in order to attain satisfactory results.

To overcome the problem of the need for constant attendance at a grill or barbecue oven to prevent burning of the foodstuffs and to turn and rotate the foodstuffs as necessary, there was developed the concept of cooking foodstuffs by convection. Device in this class have a combustion chamber from which the heated air is passed into what is then referred to as a cooking compartment. In these smoke cooking devices a combustion chamber is usually to one side of the cooking chamber and at a lower level. Use was made of baffle plates between the cooking compartment and the combustion compartment to direct the hot gases into the cooking compartment in such a way as to more completely envelop the foodstuffs placed therein. The combustion compartment usually had a removable cover thereto and it was used primarily for a warming plate while the food was being cooked in the cooking compartment.

U.S. Pat. No. 2,851,941 discloses such a device. In this patent the cooking compartment comprises a pair of fixed shelves to which the heated gas is fed by a chimney type arrangement between the combustion compartment and the cooking compartment. The heated gases pass through this chimney into the cooking compartment and with a baffle plate placed at the end of the compartment opposite the combustion compartment a flue is formed thus causing the gases to pass downward over the food into this flue in the cooking compartment and then out through the flue and its attendant chimney.

U.S. Pat. No. 3,477,360 discloses a smoke cooking device again having the combustion compartment to one side of the cooking compartment. In this patent the heated gases are directed to the cooking compartment directly from the combustion compartment without use of the flue as in U.S. Pat. No. 2,851,941. In this patent the hot gases pass upward through the grill supporting the foodstuffs. Use is also made of said baffle plate between the cooking compartment and the combustion compartment which is placed at an inclination such as to direct the heat from the underside of a grid in the combustion compartment upon which the combustible materials are placed, directly upward toward the food product to be cooked.

SUMMARY OF THE PRESENT INVENTION

The present invention differs from the known prior art in that the unit provides at least two cooking compartments and a combustion compartment in a side-by-side arrangement. One of the cooking compartments is directly above the combustion compartment and can be utilized for the conventional grilling or frying of foodstuffs placed thereon. A second cooking compartment is to one side of the first cooking compartment, being separated therefrom by a downward depending baffle plate in the upper portion of the second compartment and a second baffle plate interior of the unit and spaced from the bottom thereof extending part way up between the front and back walls in the same plane as the upper baffle. The present invention also provides two cooking racks spaced vertically from one another but slidable along their supports so that either rack may be slid into either cooking compartment. In the cooking compartment adjacent the combustion compartment there is also provided a third cooking compartment in the form of a warming drawer which can be used in some instances to actually cook products. This is made possible by the construction of the lower baffle previously mentioned.

The present device is adapted to provide the necessary cooking of foodstuffs by use of conventional combustibles such as wood or coal; can be used with an electric coil directly supplying heat; can be used with gas burners to which liquefied petroleum gas is supplied; can be used with charcoal; or can be used with a combination of charcoal and either the gas burner or the electric coil.

DESCRIPTION OF THE DRAWINGS

The present invention will now be described in the following drawings which are at varying scales in order to show certain aspects of the invention with improved clarity. The drawings show one illustrative embodiment of the present invention and in no way are to be construed as being restrictive to the scope of the invention.

FIG. I is an exterior perspective of the present invention.

FIG. II is an elevation end view with partial sections.

FIG. III is an elevation view of the front of the present invention.

FIG. IV is a perspective of one embodiment of a container for the charcoal.

FIG. V is a perspective view of the charcoal container and one embodiment of an electric coil to be used with the present invention.

FIG. VI is an end view of the container of FIG. IV in which gas burners are inserted and charcoal has been placed on top thereof.

FIG. VII is a perspective view of a portion of a skewer support showing one means to hold the ends of skewers to prevent them from sliding off the support.

DETAILED DESCRIPTION OF THE INVENTION

With reference to FIG. I this portable combined barbecue pit and oven unit consists of a generally rectangular sheet metal box 1 which is divided into two major compartments. A left hand compartment or barbecue section is stepped down from the top surface of the unit. The right hand portion of the unit is separated from the barbecue portion by two divider walls 4a and 4b. Wall 4a is positioned above the floor of the unit and extends upwardly to about the level of the first support for the lower grill 10. Wall 4b extends downwardly from the top of the unit at least below the level of the cover 6 for the barbecue portion and may extend down to a position just above the support for the upper grill 12. The vertical spacing apart of the walls 4a and 4b provides an opening 5 which extends the full depth of the unit and provides for the flow of the heated gases from the barbecue portion into the oven portion.

The back wall 9 of the unit is substantially flat except for a closeable opening in the lower right hand corner, seen best in FIG. VI wherein opening 40 provides an access for a gas line or for an electric line as will be explained later. The opening 40 is closed by a slidable gate 41 which moves vertically within guides 42.

The front wall 8 has a plurality of openings for different purposes. In the barbecue portion of the unit the opening 8a provides access readily to the grills when barbecueing is taking place in this portion and the cover 6 is raised. Below the opening 8a and in the horizontal edge thereof are a plurality of slots 18 which receive skewers in the instances when skewed food products are to be barbecued. Below the skewer openings is an opening 8c which provides means for inserting combustible materials in the form of firewood, or charcoal as will be discussed later. The opening 8c has a door 8d fitted thereto with a handle 8e. In the lower left hand corner of the front wall 8 is an opening 16 which provides access for removal of ashes in the event of a wood or charcoal fire. That portion of front wall 8 which encompasses the oven section of the unit has an opening 8f in its upper edge which again provides easy access to foods being cooked on the grills in this compartment. Below the opening 8f and in the horizontal edge thereof are a plurality of slots 18a depending from this edge for use of skewers in the event that the skewed food products are to be cooked by heated gas in this compartment. In the lower portion of front wall 8 covering the oven section is an opening 8g which receives a pan 20 used for catching the drippings in some instances or which may be used for heating foods as will be explained subsequently.

A left end wall 50 has a plurality of vents 17 in its lower edge to provide additional air for the combustible material in the barbecue portion of the unit. A handle 26 is affixed near the upper edge of this left wall. The right end wall 51 has a handle 26 also affixed thereto.

The barbecue portion of the unit is provided with a cover 6 which is mounted with hinges 30 to the upper portion of back wall 9. The cover 6 is provided with a handle 6a on its front depending panel 6b. It will be noted that the outer edges of the cover have a depending flange 6c along the sides and on the front panel. Flange 6c is to provide a seal against the unnecessary escape of the smoke or hot gases from this portion of the unit. The flange combined with the cover also provides greater stability to the cover when it is lowered over the cooking unit. It will be noted that the lower edge 6d of the front panel 6b of the door does not completely cover the slots 18. The purpose of this is to provide a weight on the skewers so that they remain in position as they are turned during the barbecueing process.

The oven portion of the unit is similarly provided with a cover 7 which is of construction substantially identical to that of cover 6 having a handle 7a, a front panel 7b, and flanges 7c. Cover 7 is mounted on the upper edge of the back wall 9 by hinges 31. It is to be noted that the back wall also carries a rest 31a against which the cover 7 may be placed when it is in the raised position. Cover 6 similarly is provided with a support 30a for the same purpose.

It will be noted that when the cover 7 is lowered over the oven unit the flange 7d on the right hand side rests on the top surface 21 of the unit. The left hand side of cover 7 rests on the upper edge of wall 4b. When cover 6 is lowered over the barbecue portion the left hand edge of the cover rests on the top edge of end wall 50. The right hand edge of the cover 6b rests on a flange portion 52 which extends laterally from wall 4b within the barbecue compartment. This flange 52 may be formed integrally with wall 4b when wall 4b is of a depth no greater than the top of the cover 6. In the event the wall 4b is extended downwardly within the unit the flange 41 may then be secured to the surface of wall 4b by a known method such as brazing and the like.

Within the unit are arranged the upper and lower grills 13 and 11 respectively which are slidably supported within the unit. The lowered grill 11 is supported by a pair of spaced horizontally-opposed angle bars, one secured to the inner surface of the front wall 8, the other to the inner surface of front wall 9. The upper grill 13 is supported by a similarly arranged pair of angle bars 12. The grills themselves are the conventional type, mainly comprising a longitudinally rod on each longitudinal side to the top of which are affixed a plurality of lateral bars. The grills are substantially the same length which corresponds generally to the length of the oven compartment. This permits the grills to be interchangeably positioned within the barbecue portion or the oven portion.

Heat for the unit may be supplied in several ways. When wood or coal is used, there is provided a fire box 15 which is inserted through door 8d in the barbeque portion. Within the fire box there may be placed a conventional type of grate (not shown) upon which conventional wood or other similar type combustible materials may be placed and ignited. The fire box may also be removed and use made of a heat resistant metal basket 53 shown in FIG. IV. With the use of the metal basket, charcoal of varying forms may be used or the basket could be used in lieu of the fire pan 15 with conventional combustible materials. The necessary heat may also be provided by an electric heating element 54 as shown in FIG. V. The heating element 54 may be used with the wire basket or it may be placed in the fire pan 15 or as shown specifically in FIG. V the coil may be placed in the wire basket 53 and charcoal placed thereon. An alternative to the electric coil would be a liquefied petroleum fired elements 55 such as shown in illustratively in FIG. VI. These units may be of the type which produce a flame on the outer edge of the unit or may be of a type which provides the flame in a bowl form. As with the electrical coil 54 the gas fired elements 55 may be used alone or may be used to ignite the charcoal in the wire basket.

The heat to the barbecue portion and the oven portion supplied as indicated by the arrows seen best in FIG. III. The barbecue portion of the unit would of course be supplied with direct heat from the fire below the grills. The heat for the oven portion is supplied through the opening 5 between divider walls 4a and 4b.

This heated gas and/or smoke will circulate within the oven and eventually will be discharged therefrom through the chimney 22 which is mounted on the upper surface 21 to the right of the oven compartment. The chimney 22 is provided with a cover 25 and a damper 24. The cover 25 is placed above the spaced openings 23 in the top of the chimney 22. Heat also is supplied to the oven portion through the opening 5a below the lower edge of wall 4a. Heat supplied in this manner passes under the drip pan 20 and up the sides again passing over whatever grills may be present in the oven compartment. While the drip pan may be used primarily to catch the drippings from the foods being cooked in the oven portion it may also be used to heat foods since the heat generated by the passage of the heated gases through opening 5a is sufficient to boil liquids in the pan 20.

When cooking meat on skewers the end of the skewer rods may be placed on the support 12 in the barbecue portion of the unit. To prevent the ends of the rods from turning or sliding along the support and perhaps dropping down use could be made of the grill 13 which could be slid across its support 12 into the barbecue portion and the end of the skewer rods placed between the lateral rods on the grill. An alternative would be to make grooves in the horizontal surface of support 12 such as grooves 56 in the horizontal surface of support 12 as shown in FIG. VII. For skewers in the oven portion of the unit there is provided a skewer end support 57 (see FIG. II) which is mounted on the inner surface of back wall 9 at the same level as the skewer slots 18. The support 57 is substantially identical to the support 12 illustrated in FIG. VII with grooves 56 placed therein. The positioning or spacing of the grills in the unit may be varied without departing from the scope of the invention. In the event the upper grill is placed above the position shown in FIGS. II and III the skewer support 57 would be placed on the back wall inner surface of back wall 9 in the barbecue portion of the unit at the same height as the skewer slots 18.

While the present invention has been illustratively shown as being adapted to be placed upon any flat surface, it is apparent that it would be provided with a wheel assembly either of a permanent or temporary nature for ease in moving it about.

The present invention provides a plurality of heating compartments; the barbecue portion in which food may be cooked on the lower grill or the upper grill or the skewers in this portion; the oven compartment in which food may be cooked on the lower grill or upper grill or skewer portions; and the lower heating compartment comprising the pan 20 which is supplied with heat passing under the pan as well as passing over the top thereof. While the present invention has been described and illustrated in one embodiment it will be apparent to those of skill in the art that structural changes can be made within the scope of the present invention which is set forth in the claims that follow.

We claim:

1. A portable cooking unit comprising a generally rectangular encloseable metal shell having one end portion of greater height than the opposite end portion, said opposite end portion comprising a barbecue section having means to provide direct heat to food and first grill means to support food over said heating means; said one end portion comprising an oven section to cook food by heated air or smoke from said barbecue section, said oven section having a second grill means in the upper half of said oven section to support food to be cooked in said oven by said heated air or smoke; said oven section and said barbecue section being separated by a pair of vertically-spaced interior walls positioned in the same vertical plane within said shell and interconnecting the front and back walls of said shell, said spaced walls providing lateral means between said barbecue section and said oven section for said flow of said heated air or smoke into and through said oven section; said barbecue section and said oven section each having an opening in the upper portion of the front wall of their respective sections to provide lateral access to food being cooked in each section, the lower edge of each said opening having a plurality of vertical openings to receive skewers; each of said barbecue and oven sections having a hinged cover with a depending front plate which closes each respective access opening when said covers are lowered, said front plates also coacting with said skewer receiving means to prevent said skewers from turning; said first and second grill means each comprising a pair of spaced horizontally-opposed angle bars mounted on the interior surfaces of the front and back walls of said shell, the first grill means being below the second grill means, and extending the length of said wall as supports for food-supporting grills, at least one of said grill supports being positioned within said shell whereby the grill thereon may be slidably moved back and forth between said oven section and said barbecue section; said unit further having smoke exhaust means extending upwardly from the oven section adjacent said oven section cover.

2. The cooking unit according to claim 1, wherein said lateral means for said flow of said heated air or smoke comprises a first opening between the lower edge of said upper vertical wall and the upper edge of said lower vertical wall, and a second opening between the bottom of said shell and the lower edge of said lower vertical wall.

3. The cooking unit according to claim 2, wherein said first opening has a vertical height such that said first and second grill means extend therethrough.

4. The cooking unit according to claim 1, wherein the outer end wall of said barbecue section contains a plurality of louvers positioned adjacent the heating means.

5. The cooking unit according to claim 1, wherein the front wall of said barbecue section has a second opening for access to said heating means and a hinged door for said second opening.

6. The cooking unit according to claim 5, wherein said heating means comprises a metal fire box insertable through said second opening, said box having grate bars positioned across and above the bottom thereof to support combustible material.

7. The cooking unit according to claim 5, wherein said means comprises a wire basket to hold combustible material.

8. The cooking unit according to claim 5, wherein said heating means is selected from the group of electric heating coils and gas burners.

9. A combined barbecue pit and oven comprising a sheet metal box having a two-level top portion, a transverse intermediate wall within said box dividing the same into a lower chamber and a higher chamber, said two chambers communicating with each other through a large opening therebetween, liftable lids covering the top of each chamber, a lower grill slidably disposed within said lower chamber and an upper grill slidably disposed within said higher chamber, a door at the front of said lower chamber and a clean-out port downwardly of said door, a fire box disposed at the bottom of said lower chamber, and air inlet cut-ins on the side wall adjacent said lower chamber, a drip pan disposed within said higher chamber directly below said upper grill, and a chimney disposed on a top wall portion laterally of the higher chamber lid.

* * * * *